United States Patent [19]
Baker et al.

[11] Patent Number: 5,863,319
[45] Date of Patent: *Jan. 26, 1999

[54] THERMALLY STABLE HOT MELT INK

[75] Inventors: Richard Baker, Keene; Ann Reitnauer, Dublin, both of N.H.

[73] Assignee: Markem Corporation, Keene, N.H

[ * ] Notice: This patent issued on a continued prosecution application filed under 37 CFR 1.53(d), and is subject to the twenty year patent term provisions of 35 U.S.C. 154(a)(2)..

[21] Appl. No.: 762,924

[22] Filed: Dec. 10, 1996

[51] Int. Cl.[6] .......................... C09D 11/02; C09D 11/10; C09D 11/12

[52] U.S. Cl. .................. 106/31.29; 106/31.3; 106/31.35; 106/31.43; 106/31.61; 106/31.62; 106/31.67; 106/31.75; 106/31.41; 106/31.73; 106/31.37; 106/31.69

[58] Field of Search .............................. 106/31.29, 31.3, 106/31.35, 31.43, 31.61, 31.62, 31.67, 31.75, 31.41, 31.37, 31.73, 31.69

[56] References Cited

U.S. PATENT DOCUMENTS

| | | |
|---|---|---|
| 2,890,124 | 6/1959 | Mange . |
| 4,336,067 | 6/1982 | Shackle et al. . |
| 4,401,791 | 8/1983 | Hultzsch et al. . |
| 4,426,227 | 1/1984 | Keeling et al. . |
| 4,472,537 | 9/1984 | Johnson et al. . |
| 4,506,057 | 3/1985 | Hultzsch et al. . |
| 4,659,383 | 4/1987 | Lin et al. . |
| 4,684,956 | 8/1987 | Ball . |
| 4,724,002 | 2/1988 | Shibata et al. . |
| 4,812,354 | 3/1989 | Sugiyama et al. . |
| 4,851,045 | 7/1989 | Taniguchi . |
| 5,000,786 | 3/1991 | Matsuzaki . |
| 5,006,170 | 4/1991 | Schwarz et al. . |
| 5,010,125 | 4/1991 | Kruse et al. ........................ 106/31.38 |
| 5,037,447 | 8/1991 | Nishimoto et al. .................... 106/31.3 |
| 5,041,482 | 8/1991 | Ornsteen et al. . |
| 5,053,079 | 10/1991 | Haxell et al. ....................... 106/31.62 |
| 5,066,332 | 11/1991 | Brown et al. . |
| 5,084,099 | 1/1992 | Jaeger et al. . |
| 5,093,406 | 3/1992 | Lossner et al. . |
| 5,122,187 | 6/1992 | Schwarz et al. . |
| 5,190,582 | 3/1993 | Shinozuka et al. . |
| 5,230,731 | 7/1993 | Kanbayashi et al. . |
| 5,259,873 | 11/1993 | Fujioka .................................. 106/20 C |
| 5,286,288 | 2/1994 | Tobias et al. . |
| 5,298,062 | 3/1994 | Davies et al. . |
| 5,350,446 | 9/1994 | Lin et al. . |
| 5,354,368 | 10/1994 | Larson, Jr. . |
| 5,385,957 | 1/1995 | Tobias et al. . |
| 5,389,132 | 2/1995 | Davulcu et al. . |
| 5,529,471 | 6/1996 | Khoshevis .............................. 425/112 |
| 5,645,632 | 7/1997 | Pavlin ................................. 106/31.29 |

*Primary Examiner*—Helene Klemanski
*Attorney, Agent, or Firm*—Fish & Richardson P.C.

[57] ABSTRACT

A thermally stable ink for use in ink jet printing contains an ester amide resin, a tackifying resin, and a colorant.

41 Claims, 1 Drawing Sheet

THERMALLY STABLE HOT MELT INK

BACKGROUND OF THE INVENTION

The invention relates to inks for ink jet printing.

Ink jet printing, for example, drop-on-demand ink jet printing, involves forming characters on a substrate by ejecting ink droplets from a printhead having one or more nozzles.

The inks may be hot melt inks that are solids at room temperature but liquids at jetting temperatures. Hot melt inks are in widespread use in ink jet printers.

Hot melt inks can have some potential drawbacks. Hot melt inks are solid at room temperature, and it is necessary to heat the inks in order to apply them to the substrates. Heating may cause the components of the ink to degrade, which may cause the ink jets to clog.

In addition, hot melt inks may be partially or fully worn off the surface of a substrate after they solidify in response to, for example, rubbing, scratching, or flexing. Hot melt inks may also cause offsetting; offsetting occurs when ink is applied to one surface, that surface contacts another surface, and an unwanted image is formed on the second surface.

Wax has often been used in hot melt inks. Wax provides the ink with the property of being solid at room temperature, but liquid at elevated temperatures. Wax can be brittle at room temperature, however, which may lead to poor adhesion of the ink to the substrate. The problem of poor adhesion may be compounded when the wax shrinks upon cooling to room temperature, disturbing the mechanical bonds between the substrate and the ink.

SUMMARY OF THE INVENTION

In general, the invention features inks for ink jet printing. The inks are composed of an ester amide resin, a tackifying resin, and a colorant. The ester amide resin is composed of polymerized fatty acids that have been combined with long chain monohydric alcohols and diamines.

The inks generally are thermally stable, flexible at room temperature, have low melt viscosity, and shrink very little upon cooling to room temperature after being applied to a substrate. Because the inks contain tackifying resins, the inks adhere well to substrates such as plastic films; coated papers, plastics, and metals; and cardboard.

The preferred inks are thermally stable at a temperature of at least 100° C. More preferred inks are thermally stable at a temperature of at least 120° C., and most preferred inks are thermally stable at a temperature of at least 140° C. The preferred inks have a flexibility of at least 3 at room temperature (22°–28° C.). More preferred inks have a flexibility of at least 5, and most preferred inks have a flexibility of at least 6.

The preferred inks have a melt viscosity of less than 100 centipoise. More preferred inks have a melt viscosity of less than 50 centiPoise, and most preferred inks have a melt viscosity of less than 30 centiPoise. The preferred inks shrink less than 20% upon cooling to room temperature after application. More preferred inks shrink less than 15%, and most preferred inks shrink less than 7%.

The term "thermally stable," as used herein, means that the ink maintains the same viscosity and IR profile after being heated to a given temperature for a period of 30 days.

The term "flexibility," as used herein, means the ability of an ink to bend, rather than break, when flexed. The flexibilities for specific compositions are given in the Description of the Preferred Embodiments, below.

The term "melt viscosity," as used herein, means the viscosity of an ink in its liquid state.

The invention also features a hot melt jet ink printing process. The process includes melting a hot melt ink, which is composed of an ester amide resin, a tackifying resin, and a colorant in a printhead in an ink jet printer, then ejecting the ink from the printhead onto a substrate. The ink solidifies on the substrate as the ink cools.

The invention further features a 3D printing process. The process includes melting a hot melt composition, which includes an ester amide resin and a tackifying resin in a printhead in a 3D printer, then ejecting the hot melt composition from the printhead onto a substrate in successive layers.

The invention further features a product which includes a substrate and a solid ink which defines an image on the substrate. The ink is composed of an ester amide resin, a tackifying resin, and a colorant.

Other features and advantages of the invention will be apparent from the description of the preferred embodiments thereof, and from the claims.

DESCRIPTION OF THE PREFERRED EMBODIMENTS

Figure 1:
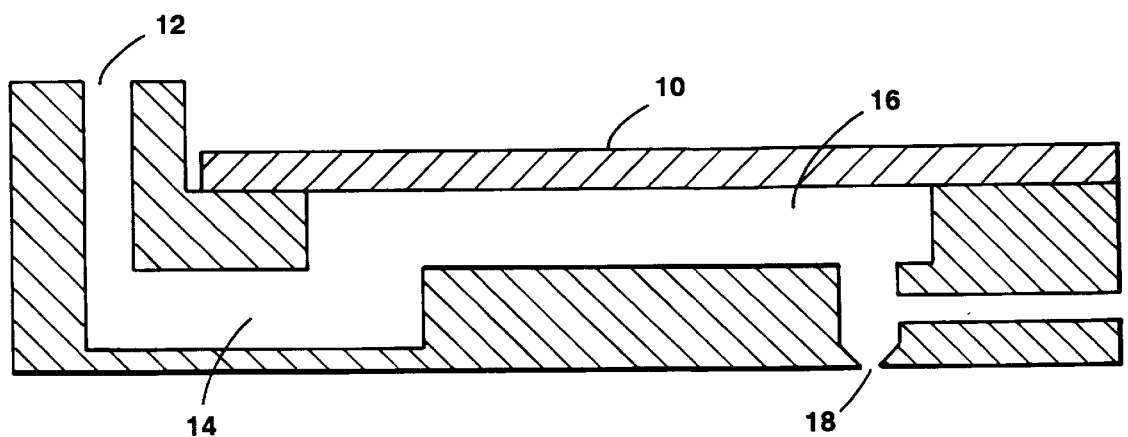
FIG. 1 is a perspective view of an ink jet printhead.

The preferred ink is a thermally stable hot melt ink that includes an ester amide resin, a tackifying resin, a wax, a stabilizer, and a dye.

The ester amide resin provides the ink with the appropriate thermal stability, flexibility, low melt viscosity, hardness, and minimal shrinkage properties. The resin is prepared by combining and heating a polymerized fatty acid, a monohydric alcohol, and a diamine, while removing the water that is formed during the course of the reaction.

The polymerized fatty acid component includes dimer fatty acids, trimer fatty acids, and higher polymerization products. The preferred fatty acids have 12 to 20 carbon atoms. More preferred fatty acids have 16 to 20 carbon atoms. The fatty acids may be saturated or unsaturated, cyclic or acyclic, etc. Examples include oleic acid, linoleic acid, linolenic acid, and tall oil fatty acid.

Preferred monohydric long chain alcohols have 22 to 90 carbon atoms. More preferred monohydric long chain alcohols have 24 to 90 carbon atoms. Examples include 1-eicosanol, 1-docosanol, and dotriacontanol, tetratriacontanol, pentatriacontanol, tetracontanol, and dopentaacontanol.

Preferred diamines have 2 to 50 carbon atoms. More preferred diamines have 2 to 12 carbon atoms when the backbone is an alkyl backbone; the backbone may be saturated or unsaturated, straight chain, cyclic, or aryl, etc. More preferred diamines have 30–50 carbon atoms when the backbone is an alkylene oxide backbone. Examples of diamines include 1,6-hexanediamine, ethylene diamine, 1,10-decanediamine, isophorone diamine, xylenediamine, poly(propyleneglycol)bis(2-aminopropylether), and other poly(alkyleneoxy) diamines, available from Texaco, Inc., under the trade name JEFFAMINE ® diamines.

The most preferred ester amide resin is X37-4978-70, available from Union Camp of Princeton, N.J., under the designation X37-4978-70.

The ink should include enough of the ester amide resin so that the ink has thermal stability, flexibility at room temperature, low melt viscosity, hardness, and low shrinkage. The ink preferably includes from about 10% to about 90%, more preferably from about 60% to about 80%, of the ester amide resin by weight.

The tackifying resin enhances the adhesion of the ink to substrates such as plastic films; coated papers, plastics, and metals; and cardboard. The ink should include enough of the tackifying resin so that the ink, when applied to such a surface, does not flake, offset, etc., but not so much that the ink is tacky at room temperature. The ink preferably includes from about 5% to about 50%, more preferably from about 10% to about 15%, of the tackifying resin by weight.

Examples of tackifying resins include glycerol esters, pentaerythritol esters, hydrocarbons, rosin, rosin esters, modified rosin esters (e.g., hydrogenated, acid, or phenolic-modified rosin esters), cumarone-indene polymers, cyclic ketone polymers, styrene allyl alcohol polymers, polystyrenes, polyvinyl toluene/methylstyrene polymers, polyvinyl chloride, polyvinyl alcohol, ethylene/vinyl acetate, ethylene/acrylic acid, alkyl hydrocarbon polymers, aryl hydrocarbon polymers, alkyl aryl hydrocarbon polymers, terpene polymers, ethylene carbon monoxide copolymers, vinyl chloride/vinyl alcohol copolymers, polyvinyl butyral, polyketones, styrene/acrylic copolymers, polybutenes, polybutadienes, styrene-isoprene-styrene, styrene-butadiene-styrene, polyvinyl pyrrolidone, polyvinyl pyridine, vinyl pyrrolidone/vinyl acetate, polyurethanes, polyesters, polyamides, cellulose esters, cellulose ethers, polyols, styrene-acrylates, polypropylene, chlorinated polypropylene, chlorinated paraffin, gilsonite and other asphaltic materials, cyclic hydrocarbon polymer, halogenated polymers, acrylics, epoxides, novolacs, and other synthetic and natural resins. The most preferred tackifying resin is polyterpene, available from Goodyear under the trade name Wingtack 86.

The wax component decreases the tackiness of the ink at room temperature and helps provide the ink with the targeted melting point. Preferably the wax, or blend of waxes, has a melting point generally lower than the temperature at which the ink jet printer operates. The ink should contain enough wax that the ink is not tacky at room temperature, but not so much that the ink becomes brittle. The ink preferably includes from about 5% to about 60%, more preferably from about 10% to about 20%, of the wax by weight.

Examples of waxes include stearic acid, lauric acid, linear polyethylene, behenic acid, stearone, carnauba wax, microcrystalline waxes, paraffin waxes, polyethylene wax, candelilla wax, montan wax, Fischer-Tropsch waxes, bisamide waxes, amide waxes, hydrogenated castor oil, synthetic ester waxes, oxidized polyethylene waxes, oleamides, stearamides, lauramides, erucamides, glycerol esters, chlorinated waxes, urethane modified waxes, and other synthetic and natural waxes. The most preferred wax is microcrystalline wax, available from Petrolite under the trade name BE SQUARE 175 AMBER.

The stabilizer inhibits oxidation of the ink components. Sufficient stabilizer should be included to inhibit oxidation, but not so much should be included that the other properties of the ink are adversely affected. The ink preferably includes less than about 2%, more preferably from about 0.3% to about 0.8%, of the stabilizer by weight. Suitable stabilizers include antioxidants and heat stabilizers such as hindered phenols, organophosphites, phosphited phenols, phosphited bisphenols, bisphenols, and alkylated phenolics. The most preferred stabilizer is terakis[methylene (3,5-di-t-butyl-4-hydroxylhydrocinnamate)]methane, available from Ciba under the trade name IRGANOX 1010.

The dye provides the substantially permanent color to the substrate when the ink is printed on the substrate. The ink preferably includes a sufficient quantity of dye so that the ink has adequate color. Preferred inks include less than about 10%, more preferably from about 1% to about 2%, of the dye by weight. Examples of dyes include anthraquinone and perinone reds such as solvent red 172, solvent red 111, solvent red 222, solvent red 207, and solvent red 135; anthraquinone blues such as solvent blue 104, solvent violet 13; anthraquinone greens such as solvent green 3 and solvent green 5; xanthane, quinoline, quinophthalone, pyrazolone, methine, and anthraquinoid yellows such as solvent yellow 98, solvent yellow 33, disperse yellow 54, solvent yellow 93, disperse yellow 82, and solvent yellow 163. Most preferred dyes include SANDOPLAST BLUE 2B (available from Clariant), Oracet yellow GHS (available from Ciba), and Polysolve Red 207 (available from Polysolve).

The ink optionally may include other conventional hot melt ink ingredients such as flexibilizers/plasticizers. Examples of flexibilizers/plasticizers include aromatic sulfonamides, phthalates, acetates, adipates, amides, azelates, epoxides, glutarates, laurates, oleates, sebacates, stearates, sulfonates, tallates, phosphates, benzoin ethers, and trimellitates. A sufficient quantity of an optional ingredient may be included in the ink to provide the desired property.

The hot melt inks generally are prepared by combining the resins, the wax components, and the stabilizer, heating the combination to its melting point, and slowly stirring until the liquified combination is homogeneous. The dye then is added to the mixture with stirring. The molten ink then is filtered to remove particles larger than 1 $\mu$m in size.

EXAMPLE 1

A thermally stable blue hot melt ink was prepared that included 69.74 weight % X37-4978-70 (available from Union Camp of Princeton, N.J.), 16.48 weight % BE SQUARE 175 AMBER (available from Petrolite), 12.29 weight % Wingtack 86 (available from Goodyear), 0.50 weight % IRGANOX 1010 (available from Ciba), and 1.00 weight % SANDOPLAST BLUE 2B (available from Clariant).

EXAMPLE 2

A thermally stable black hot melt ink was prepared that included 69.25 weight % X37-4978-70 (available from Union Camp of Princeton, N.J.), 16.37 weight % BE SQUARE 175 AMBER (available from Petrolite), 12.20 weight % Wingtack 86 (available from Goodyear), 0.50 weight % IRGANOX 1010 (available from Ciba), 0.94 weight % Oracet yellow GHS (available from Ciba), 0.27 weight % Polysolve Red 207 (available from Polysolve), and 0.48 weight % SANDOPLAST BLUE 2B (available from Clariant).

The preferred inks can be used with a conventional hot melt ink jet printer, such as a Markem 962 printer. Referring to FIG. 1, the printhead 10 of this printer includes a fill port 12, a membrane cavity 14, a pumping chamber 16, a PZT (piezoelectric transducer) 18, and an orifice 20. The ink is placed in the printhead through the fill port 12; the ink then passes through the membrane cavity 14, where is it degassed. The ink then flows into the pumping chamber 16. The printhead 10 is heated, so that the ink is melted to a liquid state prior to being ejected from the ink jet printhead. The liquid ink is ejected by activation of the PZT (piezoelectric transducer) 18. As a substrate passes by the orifice 20, droplets of the hot, liquid ink is ejected through the orifice. Upon contacting the substrate, which is typically at room temperature, the liquid ink cools and solidifies.

The preferred inks are thermally stable. Therefore, they have a reduced tendency to degrade in the hot ink jet printheads; this in turn reduces clogging of the printheads. The preferred inks also have a low melt viscosity. Moreover, the preferred inks remain flexible upon cooling to room temperature; this reduces flaking and offsetting of the inks on the cooled substrates.

Flexibility is measured by placing a 1.5 gram sample of an ink in an aluminum dish with a 2-inch diameter. The ink is melted, forming a thin film in the aluminum dish. The dish is allowed to return to room temperature for at least two hours, then manually flexed. A flexibility of 10 indicates best flexibility, while a flexibility of 1 indicates worst flexibility.

The flexibilities for 5 examples are shown in the table below. The left column indicates the ingredient; the other 5 columns indicate the weight percents of the ingredients used in each of the examples.

TABLE 1

| Flexibilities of Compositions | | | | | |
|---|---|---|---|---|---|
| Ingredient | Ex. 1 | Ex. 2 | Ex. 3 | Ex. 4 | Ex. 5 |
| ester amide resin (X37-4978-70) | 55 | 70 | 70.6 | 60 | 0 |
| tackifying resin (Wingtack 86) | 28.5 | 15 | 12.9 | 40 | 90.0 |
| microcrystalline wax (Ultraflex Amber) | 16.5 | 0 | 0 | 0 | 0 |
| microcrystalline wax (OK (Okerin) 103) | 0 | 15 | 0 | 0 | 0 |
| microcrystalline wax (BE SQUARE 175) | 0 | 0 | 16.5 | 0 | 9.1 |
| Total | 100 | 100 | 100 | 100 | 100 |
| Flexibility | 10 | 9 | 6 | 2 | 1 |

The preferred inks remain hard after cooling to room temperature. This reduces the offsetting of the ink on the cooled substrates. The inks essentially do not shrink upon cooling to room temperature; this enables the inks to maintain mechanical bonds with the substrates, thereby enhancing adhesion of the inks to the substrates.

The low shrinkage property of the ink is also advantageous because the ink does not shrink inside the printhead upon cooling to room temperature. Other hot melt inks can exhibit significantly more shrinkage upon cooling, which allows air to enter the printhead. Each time the printhead is heated again in order to melt and eject the ink, the printhead must be purged in order to expel the air. The purge cycles, which waste both time and ink, are not necessary when the preferred inks are used.

The inks may also be used for 3D printing; 3D printing is used to build 3-dimensional models, which have several advantages over conventional 2-dimensional images. The models are formed by depositing successive layers of ink onto a surface, which is held on a platform. A "print" head including multiple jets in an array builds models in successive layers. The printhead moves back and forth in the same manner as a line printer, along the X axis. If the desired part is wider than the printhead, the platform repositions along the Y axis to continue building the layer. When the first layer is complete, the platform is distanced from the printhead along the Z axis, and the printhead begins building the next layer. The process is continued until the model is complete.

Other embodiments are within the claims.

What is claimed is:

1. An ink for use in hot melt ink jet printing comprising an ester amide resin, a tackifying resin, a wax and a colorant.

2. The ink of claim 1, wherein said ester amide resin comprises a polymerized fatty acid component, wherein said fatty acid has more than 12 carbon atoms.

3. The ink of claim 1, wherein said ester amide resin comprises a monohydric long chain alcohol, wherein said alcohol has more than 22 carbon atoms.

4. The ink of claim 1, wherein said ester amide resin comprises a diamine, wherein said diamine has 2 to 50 carbon atoms.

5. The ink of claim 1, wherein said ester amide resin comprises a polymerized fatty acid component, wherein said fatty acid has more than 12 carbon atoms, a monohydric long chain alcohol, wherein said alcohol has more than 22 carbon atoms, and a diamine, wherein said diamine has 2 to 50 carbon atoms.

6. The ink of claim 1, wherein said tackifying resin is selected from the group consisting of glycerol esters, pentaerythritol esters, hydrocarbons, rosin, rosin esters, modified rosin esters, cumarone-indene polymers, cyclic ketone polymers, styrene allyl alcohol polymers, polystyrenes, polyvinyl toluene/methylstyrene polymers, polyvinyl chloride, polyvinyl alcohol, ethylene/vinyl acetate, ethylene/acrylic acid, alkyl hydrocarbon polymers, aryl hydrocarbon polymers, alkyl aryl hydrocarbon polymers, terpene polymers, ethylene carbon monoxide copolymers, vinyl chloride/vinyl alcohol copolymers, polyvinyl butyral, polyketones, styrene/acrylic copolymers, polybutenes, polybutadienes, styrene-isoprene-styrene, styrene-butadiene-styrene, polyvinyl pyrrolidone, polyvinyl pyridine, vinyl pyrrolidone/vinyl acetate, polyurethanes, polyesters, polyamides, cellulose esters, cellulose ethers, polyols, styrene-acrylates, polypropylene, chlorinated polypropylene, chlorinated paraffin, gilsonite and other asphaltic materials, cyclic hydrocarbon polymer, halogenated polymers, acrylics, epoxides, novolacs, and polyterpene.

7. The ink of claim 1, wherein said tackifying resin is polyterpene.

8. The ink of claim 1, wherein said ink further comprises a component that reduces tackiness at room temperature.

9. The ink of claim 1, wherein said ink further comprises a melting point adjuster.

10. The ink of claim 1, wherein said ink further comprises a stabilizer.

11. The ink of claim 1, wherein said colorant comprises a dye.

12. The ink of claim 1, wherein said ink further comprises a wax and a stabilizer, wherein said ink comprises about 10% to about 100% by weight ester amide resin, about 5% to about 50% by weight tackifying resin, less than about 10% by weight colorant, about 5% to about 60% by weight wax, and less than about 2% stabilizer.

13. The ink of claim 1, wherein said ink is thermally stable at a temperature of at least about 100° C.

14. The ink of claim 1, wherein said ink is thermally stable at a temperature of at least about 140° C.

15. The ink of claim 1, wherein said ink has flexibility of at least about 3 at room temperature.

16. The ink of claim 1, wherein said ink has melt viscosity of less than about 100 centiPoise.

17. The ink of claim 1, wherein said ink has melt viscosity of less than about 70 centiPoise.

18. The ink of claim 1, wherein said ink shrinks less than about 20% upon cooling to room temperature after application.

19. A hot melt jet ink printing process, comprising (a) melting a hot melt ink comprising an ester amide resin, a tackifying resin, a wax and a colorant in a printhead in an ink jet printer, and (b) ejecting said hot melt ink from said printhead onto a substrate, said ink solidifying on said substrate as said ink cools.

20. The printing process of claim 19, wherein said printhead is allowed to cool to room temperature after said hot melt-ink is ejected, said method further comprising repeating steps (a) and (b) without initially purging air from said printhead.

21. The printing process of claim 19, wherein said ester amide resin comprises a polymerized fatty acid component, wherein said fatty acid has more than 12 carbon atoms, a monohydric long chain alcohol, wherein said alcohol has more than 22 carbon atoms, and a diamine, wherein said diamine has 2 to 50 carbon atoms.

22. The printing process of claim 19, wherein said tackifying resin is selected from the group consisting of glycerol esters, pentaerythritol esters, hydrocarbons, rosin, rosin esters, modified rosin esters, cumarone-indene polymers, cyclic ketone polymers, styrene allyl alcohol polymers, polystyrenes, polyvinyl toluene/methylstyrene polymers, polyvinyl chloride, polyvinyl alcohol, ethylene/vinyl acetate, ethylene/acrylic acid, alkyl hydrocarbon polymers, aryl hydrocarbon polymers, alkyl aryl hydrocarbon polymers, terpene polymers, ethylene carbon monoxide copolymers, vinyl chloride/vinyl alcohol copolymers, polyvinyl butyral, polyketones, styrene/acrylic copolymers, polybutenes, polybutadienes, styrene-isoprene-styrene, styrene-butadiene-styrene, polyvinyl pyrrolidone, polyvinyl pyridine, vinyl pyrrolidone/vinyl acetate, polyurethanes, polyesters, polyamides, cellulose esters, cellulose ethers, polyols, styrene-acrylates, polypropylene, chlorinated polypropylene, chlorinated paraffin, gilsonite and other asphaltic materials, cyclic hydrocarbon polymer, halogenated polymers, acrylics, epoxides, novolacs, and polyterpene.

23. The printing process of claim 19, wherein said ink further comprises a stabilizer.

24. The printing process of claim 20, wherein said colorant comprises a dye.

25. The printing process of claim 19, wherein said substrate is selected from the group consisting of plastic films, coated paper, coated plastics, coated metals, and cardboard.

26. A product comprising a substrate and a solid ink defining an image on said substrate, said ink comprising an ester amide resin, a tackifying resin, and a colorant.

27. A hot melt composition for use in 3D printing comprising an ester amide resin, a wax and a tackifying resin.

28. The composition of claim 27, wherein said ester amide resin comprises a polymerized fatty acid component, wherein said fatty acid has more than 12 carbon atoms, a monohydric long chain alcohol, wherein said alcohol has more than 22 carbon atoms, and a diamine, wherein said diamine has 2 to 50 carbon atoms.

29. The composition of claim 27, wherein said tackifying resin is selected from the group consisting of glycerol esters, pentaerythritol esters, hydrocarbons, rosin, rosin esters, modified rosin esters, cumarone-indene polymers, cyclic ketone polymers, styrene allyl alcohol polymers, polystyrenes, polyvinyl toluene/methylstyrene polymers, polyvinyl chloride, polyvinyl alcohol, ethylene/vinyl acetate, ethylene/acrylic acid, alkyl hydrocarbon polymers, aryl hydrocarbon polymers, alkyl aryl hydrocarbon polymers, terpene polymers, ethylene carbon monoxide copolymers, vinyl chloride/vinyl alcohol copolymers, polyvinyl butyral, polyketones, styrene/acrylic copolymers, polybutenes, polybutadienes, styrene-isoprene-styrene, styrene-butadiene-styrene, polyvinyl pyrrolidone, polyvinyl pyridine, vinyl pyrrolidone/vinyl acetate, polyurethanes, polyesters, polyamides, cellulose esters, cellulose ethers, polyols, styrene-acrylates, polypropylene, chlorinated polypropylene, chlorinated paraffin, gilsonite and other asphaltic materials, cyclic hydrocarbon polymer, halogenated polymers, acrylics, epoxides, novolacs, and polyterpene.

30. The composition of claim 27, wherein said composition further comprises a wax.

31. The composition of claim 27, wherein said ink further comprises a stabilizer.

32. The composition of claim 27, wherein said ink is thermally stable at a temperature of at least about 100° C.

33. The composition of claim 27, wherein said ink has flexibility of at least about 3 at room temperature.

34. The composition of claim 27, wherein said ink has melt viscosity of no more than about 100 centiPoise.

35. The composition of claim 27, wherein said ink shrinks no more than about 20% upon cooling to room temperature after application.

36. A 3D printing process comprising (a) melting a hot melt composition comprising an ester amide resin, and a tackifying resin, in a printhead in a 3D printer and (b) ejecting said hot melt composition from said printhead onto a substrate in successive layers.

37. An ink for use in hot melt ink jet printing comprising an ester amide resin, a wax and a colorant.

38. The ink of claim 37 wherein the ink includes from about 5% to 60% wax.

39. The ink of claim 38, wherein said ester amide resin comprises a polymerized fatty acid component, wherein said fatty acid has more than 12 carbon atoms, a monohydric long chain alcohol, wherein said alcohol has more than 22 carbon atoms, and a diamine, wherein said diamine has 2 to 50 carbon atoms.

40. The ink of claim 39 further comprises a tackifying resin.

41. The ink of claim 40, wherein said tackifying resin is selected from the group consisting of glycerol esters, pentaerythritol esters, hydrocarbons, rosin, rosin esters, modified rosin esters, cumarone-indene polymers, cyclic ketone polymers, styrene allyl alcohol polymers, polystyrenes, polyvinyl toluene/methylstyrene polymers, polyvinyl chloride, polyvinyl alcohol, ethylene/vinyl acetate, ethylene/acrylic acid, alkyl hydrocarbon polymers, aryl hydrocarbon polymers, alkyl aryl hydrocarbon polymers, terpene polymers, ethylene carbon monoxide copolymers, vinyl chloride/vinyl alcohol copolymers, polyvinyl butyral, polyketones, styrene/acrylic copolymers, polybutenes, polybutadienes, styrene-isoprene-styrene, styrene-butadiene-styrene, polyvinyl pyrrolidone, polyvinyl pyridine, vinyl pyrrolidone/vinyl acetate, polyurethanes, polyesters, polyamides, cellulose esters, cellulose ethers, polyols, styrene-acrylates, polypropylene, chlorinated polypropylene, chlorinated paraffin, gilsonite and other asphaltic materials, cyclic hydrocarbon polymer, halogenated polymers, acrylics, epoxides, novolacs, and polyterpene.

* * * * *